United States Patent
Crawford

Patent Number: 5,628,141
Date of Patent: May 13, 1997

[54] LINE STRIPPING BASKET

[76] Inventor: Robert J. Crawford, 441 Range Rd., Cumberland Center, Me. 04021

[21] Appl. No.: 517,350

[22] Filed: Aug. 21, 1995

[51] Int. Cl.$^6$ .................................................. A01K 97/00
[52] U.S. Cl. .............................. 43/54.1; 43/4; 224/240
[58] Field of Search ................ 43/54.1, 4; 224/240, 224/665, 666

[56] References Cited

U.S. PATENT DOCUMENTS

| | | |
|---|---|---|
| 1,198,202 | 9/1916 | Drinkard . |
| 2,490,279 | 12/1949 | Nunamaker . |
| 2,576,624 | 11/1951 | Miller . |
| 2,625,192 | 1/1953 | Kinskie .................... 224/240 X |
| 2,822,116 | 2/1958 | Smalley et al. ............. 224/240 X |
| 3,358,399 | 12/1967 | Waldmann .................... 43/4 |
| 3,363,355 | 1/1968 | Kellner ...................... 43/5 |
| 3,795,072 | 3/1974 | Sherman ..................... 43/25 |
| 4,297,802 | 11/1981 | Normann ...................... 43/4 |
| 4,402,471 | 9/1983 | Normann .................... 43/4 X |
| 5,182,877 | 2/1993 | Burchill .................... 43/54.1 |
| 5,205,448 | 4/1993 | Kester et al. ............. 224/240 X |
| 5,240,156 | 8/1993 | Sicotte et al. ............ 224/240 X |
| 5,297,355 | 3/1994 | O'Brien ....................... 43/4 |
| 5,397,040 | 3/1995 | Lee ......................... 224/240 X |

FOREIGN PATENT DOCUMENTS 2274049  7/1994  United Kingdom .

OTHER PUBLICATIONS

J.W. Outfitters Catalog; p. 16; Stripping Basket; 1995.
The Creek Co. Ltd. Catalog; Pelican Stripping Apron; 1995.
DB Dun Inc. Catalog; p. 5; 1995.
LL Bean Catalog; p. 51; Stripping Basket; Spring 1995.
Cabela's Catalog; p. 30; Pelican Stripping Basket; Spring 1995.

*Primary Examiner*—Joseph J. Hail, III
*Assistant Examiner*—Jay A. Stelacone
*Attorney, Agent, or Firm*—Jones, Tullar & Cooper, P.C.

[57] ABSTRACT

A line stripping basket is used by fly casters to hold line stripped from a reel prior to being cast or upon being manually retrieved by a fly angler. The line stripping basket utilizes a waist encircling wading belt and a cooperating flexible line receiving basket that is attachable to, and detachable from the wading belt. The flexible basket has fabric or mesh sidewalls, an open mesh bottom and may carry one or more line stabilizing devices. The line stripping basket can be stowed in a belt attached pouch.

19 Claims, 3 Drawing Sheets

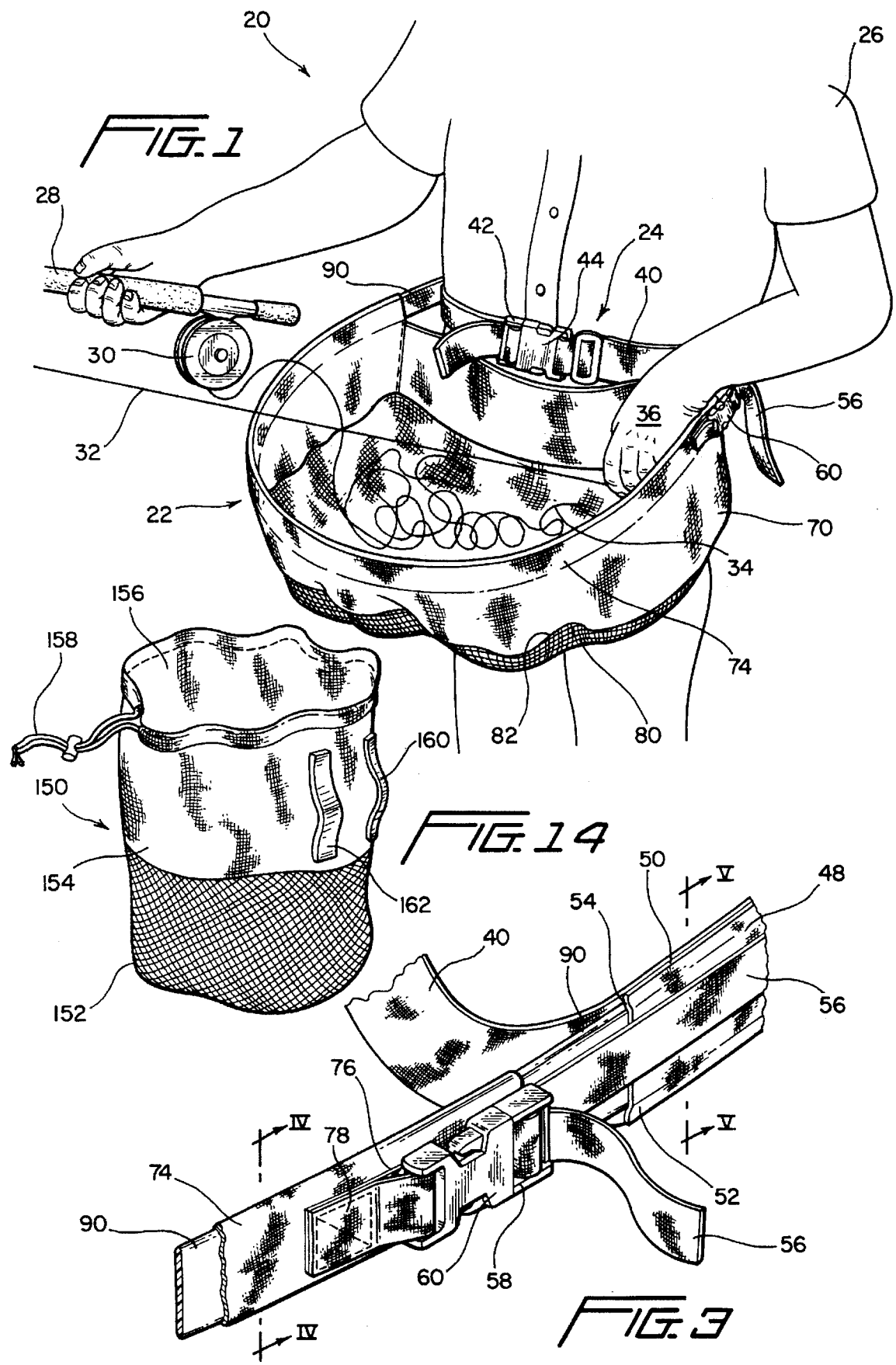

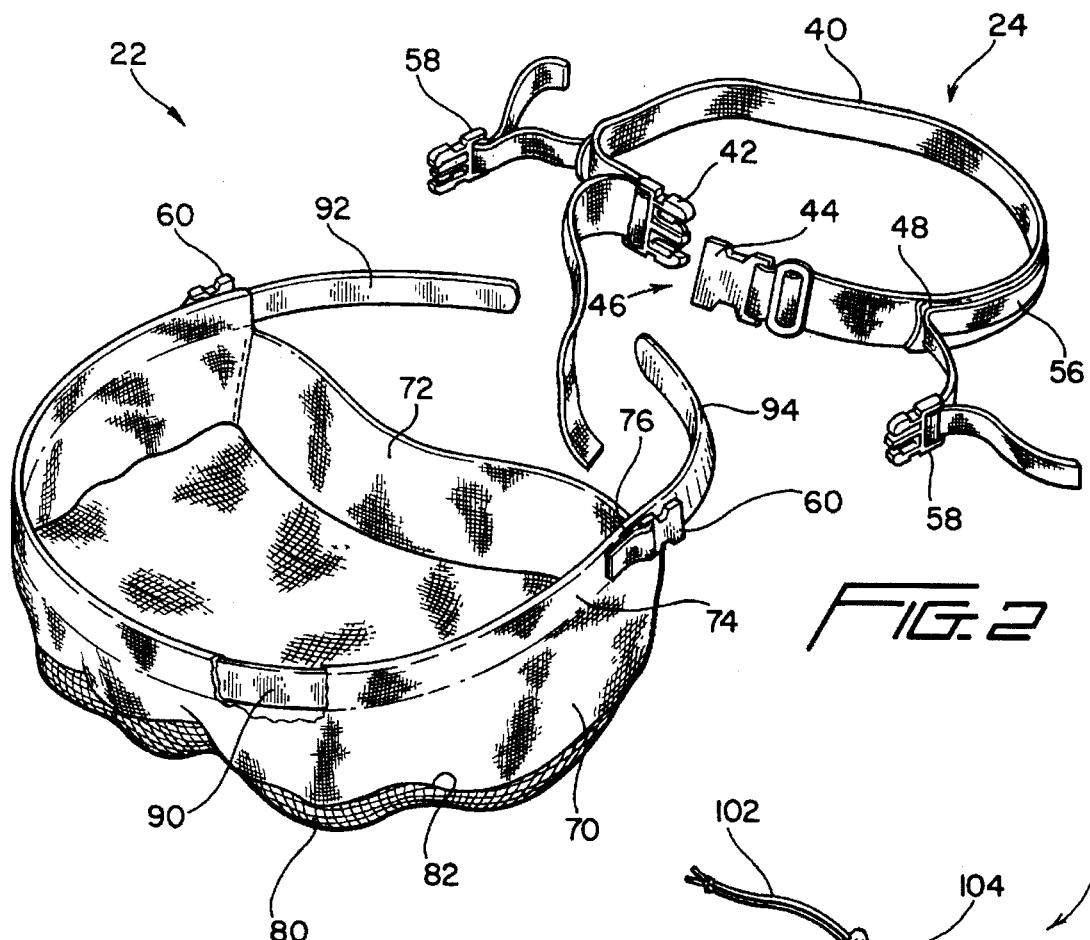
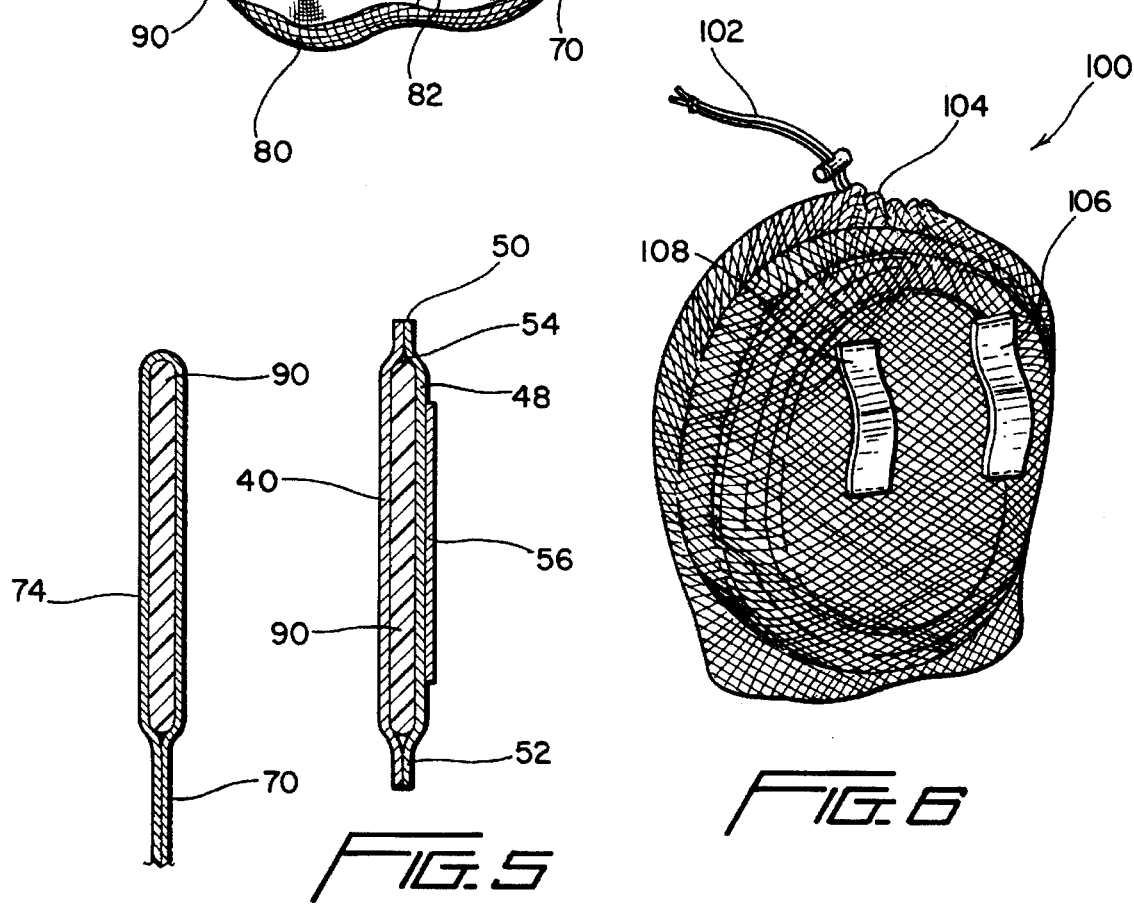

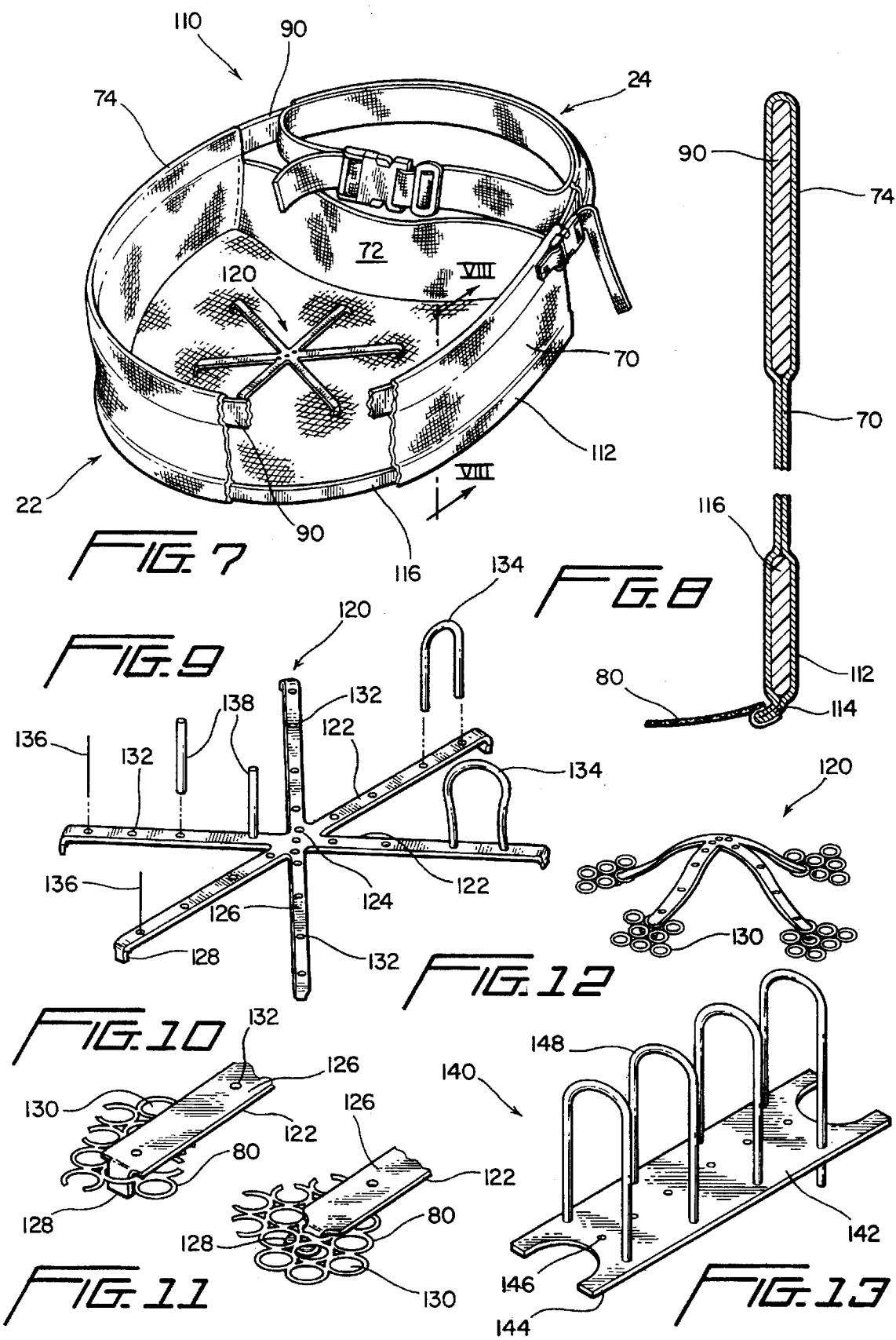

LINE STRIPPING BASKET

FIELD OF THE INVENTION

The present invention is directed generally to a line stripping basket. More particularly, the present invention is directed to a fly casting line stripping basket. Most specifically, the present invention is directed to a collapsible, flexible, line stripping basket. The line stripping basket utilizes a line receiving basket which is provided with an open mesh bottom, with fabric sidewalls, and with one or two plastic bands or hoops that define and structure the line receiving basket. An upper one of these plastic hoops has free ends which are insertable into cooperatively shaped pockets in a waist encircling wading belt. The basket and its plastic hoop or hoops are quickly releasable from the waist belt, if necessary. One or more line stabilizing devices may be removably placed in the mesh bottom portion of the basket.

DESCRIPTION OF THE PRIOR ART

In the sport of fly fishing and fly casting, the angler attempts to place a hook, disguised or dressed with colorful lightweight natural or synthetic materials, in a particular location where it will hopefully attract the attention, and incite the strike of a fish. The fly itself usually has very little weight and it, together with its camouflaged hook, are attached to the free end of a length of light test line, such as light monofilament line which is then attached to a heavier line usually specially designed for fly casting. The fly line is initially stored on a reel which is located at the butt end of a light weight fly casting rod. The sport of fly casting and fly fishing is not similar to other types of fishing, such as surf casting in which a single cast is sufficient to propel a hook and a sinker or a lure away from the angler and to pull the attached line off its reel. In fly casting, the fly, hook and its associated line is positioned aloft by a series of movements of the fly casting rod in a somewhat back and forth or whip-like fashion which energizes and casts the line. As is well known in the art of fly casting and fly fishing, the force of the fly being cast is not sufficient to propel the line in a cast or to pull it off the reel upon which it is stored.

A fly fisherman typically pulls a length of line off the reel of his fly casting rod and deposits this pulled or stripped line either directly onto the surface of the body of water in which he is wading, or more typically into or onto some type of line support that he has attached to himself. Fly fishermen do not generally use the reel to move the line or fly. The line and fly are pulled or moved manually by the fly angler. The retrieved line is then either held in the angler's hand or deposited on the water or on the floor of a boat awaiting the next cast. Many fly casters have constructed crude stripped line receiving devices from plastic dish pans or other similar generally shallow plastic receptacles. These rudimentary stripped line receptacles are often cumbersome, awkward arrangements which have detracted from the enjoyment and pleasure that would otherwise be derived from the sport.

Several prior art patents are directed to line routing and storing devices. U.S. Pat. Nos. 4,297,802 and 4,402,471 to Normann both show a generally cylindrically shaped, non-rotatable arbor which is securable to the user by a waist-encircling belt. This arbor acts as a spool or hub about which a number of turns of fly casting line are placed. The fly fisherman pulls a length of line off his reel, enwraps it on the arbor, pulls it off the arbor during casting, and places the line back on the arbor as it is retrieved.

The patent to Burchill, et al. U.S. Pat. No. 5,182,877 shows a fish line stripping basket that utilizes a generally rigid plastic receptacle whose interior is provided with a plurality of slope-surfaced protuberances. The plastic receptacle is strapped about the waist of the user and a length of line is deposited into the receptacle, generally about and around the slope or cone shaped protuberances.

Various other attempts have been made to provide a solution to the fly caster's concern about where to deploy the line that he has stripped from his fly casting rod's reel. These have ranged from other belt attached, generally rigid receptacles; i.e. modified dish pans, to various body attached or mouth held clips and the like. All of these prior art arrangements have been found to be deficient in one way or another. None has allowed the fly fisherman to concentrate fully on what he really wants to do, which is to cast his fly to the location where it will prove irresistible to the fish. Similarly, none has allowed the fly angler to have an unimpeded view of his or her feet.

It will be apparent that the prior art solutions to the problem of providing a well structured, functional, unobtrusive line stripping basket have not been successful. The line stripping basket in accordance with the present invention overcomes the limitations of the prior art and is a significant improvement over the prior art.

SUMMARY OF THE INVENTION

It is an object of the present invention to provide a line stripping basket.

Another object of the present invention is to provide a fly casting line stripping basket.

A further object of the present invention is to provide a collapsible, flexible line stripping basket.

Yet another object of the present invention is to provide a line stripping basket which is releasably securable to a waist encircling wading belt.

Still a further object of the present invention is to provide a line stripping basket having removable line stabilizing devices.

Even yet another object of the present invention is to provide a line stripping basket which is compactable for storage.

Still even a further object of the present invention is to provide a line stripping basket which is unobtrusive yet highly functional.

An even further object of the present invention is to provide a line stripping basket that drains and which the angler can easily look through.

As will be discussed in greater detail in the description of the preferred embodiments which will be presented subsequently, the line stripping basket in accordance with the present invention utilizes a flexible line receiving basket having fabric sidewalls with an open mesh bottom. The basket has at least an upper plastic hoop or band, and may also include a lower plastic hoop or band. The flexible basket is attachable to a waist encircling wading belt by insertion of free ends of the upper plastic band into cooperatively shaped pockets in the wading belt. If the wearer of the basket should need to, he can easily release and remove the basket from the waist band while keeping the waist belt intact. The open mesh bottom of the flexible line receiving basket can receive and retain one or more line stabilizing devices or spiders. These line stabilizers can receive either hoops or spikes of monofilament line, plastic rods or hollow tubes, all of which function to stabilize the coils of line placed in the flexible basket.

The line stripping basket in accordance with the present invention is far superior to the prior art procedures and devices that have previously been utilized. The practice of merely deploying stripped line onto the surface of the body of water in which the angler is standing or on the floor or deck of a boat is clearly unsatisfactory for several reasons. There is always the surface tension of the water to retard the release of the line. In addition, various currents, ripples, possible floating debris and the like will likely entangle the line or create other problems. The present line stripping basket supports the line and prevents entanglement in a manner which retains the line in a sheltered, protected area. The open mesh surface of the bottom of the basket allows water to escape easily and also allows the fly angler to see his or her feet.

In contrast to the prior art rigid arbors and modified wash pans, the line stripping basket in accordance with the present invention is flexible and conforms with the wearer's shape. This means that it is unobtrusive in use and performs its function of retaining and holding stripped line without making the angler feel as if he is burdened with a cumbersome rigid structure strapped to his waist. The enjoyment of the fly caster with his sport is enhanced by the present invention instead of being limited as has been the case with the prior art devices. The line stripping basket is also ergonomically designed so that the natural arc of the angler's forearm will swing into the basket.

If the user of the line stripping basket of the present invention should lose his footing and fall, or should suddenly find himself in deeper water, he can immediately release the basket portion of the present invention from the waist encircling wading belt by merely releasing two fastening clips. The encircling belt remains intact preventing the angler, who is typically wearing chest high waders, from having his or her waders immediately flood. This is a significant advantage over the prior art devices which have been attached to the user in a fashion that makes release of the basket difficult in an emergency situation.

When the line stripping basket in accordance with the present invention is not being used, it can be compacted and stored in a small pouch. Every fisherman appreciates a product which will store in a small amount of space and will thus reduce its physical size for purposes of transport and storage. The invention is large when in use and compact when not in use. The line stripping basket of the present invention can be reduced in size when not in use and will fit into a belt attachable storage bag or pouch.

The line stripping basket in accordance with the present invention overcomes the limitations of the prior art devices. It provides a functional, well-constructed line receiving basket which is an aid to its user instead of a distraction. The flexible line stripping basket of the present invention is a substantial advance in the art.

BRIEF DESCRIPTION OF THE DRAWINGS

While the novel features of the line stripping basket in accordance with the present invention are set forth with particularity in the appended claims, a full and complete understanding of the invention may be had by referring to the detailed description of the preferred embodiments which are set forth subsequently, and as illustrated in the accompanying drawings, in which:

FIG. 1 is a perspective view of a first preferred embodiment of a line stripping basket in accordance with the present invention and showing the basket in place about the waist of the user;

FIG. 2 is a perspective view generally similar to FIG. 1 but showing the flexible line receiving basket separated from its associated wading belt;

FIG. 3 is a perspective view of a portion of the flexible basket and the wading belt and showing the cooperative connection between the two;

FIG. 4 is a cross-sectional view of a portion of the flexible basket taken along line IV—IV of FIG. 3;

FIG. 5 is a cross-sectional view of a portion of the wading belt and taken along line V—V of FIG. 3;

FIG. 6 is a perspective view of a first preferred embodiment of a mesh belt pouch into which the line stripping basket may be placed for transport and storage;

FIG. 7 is a perspective view of a second preferred embodiment of the flexible basket in accordance with the present invention;

FIG. 8 is a cross-sectional view of a portion of the flexible basket taken along line VIII—VIII of FIG. 7;

FIG. 9 is an exploded perspective view of a first preferred embodiment of a line stabilizing device for the line stripping basket in accordance with the present invention;

FIG. 10 is a perspective view of a first embodiment of a portion of one of the legs of the line stabilizing device of FIG. 9;

FIG. 11 is a perspective view of a second embodiment of a portion of one of the legs of the line stabilizing device of FIG. 9;

FIG. 12 is a perspective view of the line stabilizing device of FIG. 9 positioned in the line stripping basket in a tensioning position;

FIG. 13 is a perspective view of a second preferred embodiment of a line stabilizing device in accordance with the present invention; and FIG. 14 is a perspective view of a second preferred embodiment of the belt pouch in accordance with the present invention.

DETAILED DESCRIPTION OF THE PREFERRED EMBODIMENTS

Referring initially to FIG. 1, there may be seen, generally at 20, a first preferred embodiment of a line stripping basket in accordance with the present invention. Line stripping basket 20 is comprised generally of a flexible line receiving basket 22 and of a waist encircling wading belt, generally at 24, to which the flexible basket 22 is releasably secured in a manner which will be discussed in detail shortly. In FIG. 1, the wading belt 24 is shown in place about the waist of an angler 26 who is holding a fly casting rod 28, having a reel 30 which holds a suitable length of fly fishing line 32. A plurality of coils 34 of this line 32 have been stripped off the reel 30 and are deployed in the flexible line receiving basket 22 where they are supported and can be manipulated by the stripping hand 36 of the angler 26. As is well known by fly casters, the casting rod 28 is manipulated back and forth by the angler 26 to play out a sufficient amount of the fly fishing line 32 from the line coils 34 in the flexible basket 22, in concert with movement of the anglers' stripping hand 26, so that ultimately sufficient line 32 will be in the air to facilitate casting of the fly, not shown, which is positioned at the free end of the line 32, to the desired spot where it will tempt a fish. Line 32 can then be returned to the basket 22 as the fly angler manually strips and retrieves line to manipulate the fly.

As may be seen in FIG. 1, and as is also shown in FIG. 2, the flexible line receiving basket 22 and the wading belt 24 cooperate to form the line stripping basket, generally at 20. The wading belt 24 includes a size adjustable waist encircling belt 40 which carries a suitable two piece male 42 and female 44 releasable waist belt buckle assembly 46. Such two piece, releasable buckle assemblies 46 are generally well known in the art and need not be discussed in detail. One end of the waist belt 40 is secured to the female buckle component 44 while the other end of the waist belt 40 is slidable in the male buckle component 42 to provide a waist size adjusting capability for the waist belt 40. It will be understood that either the male or female component of the waist belt buckle 46 could be slidable to vary the effective circumferential size of the waist belt 40. Waist belt 40 is preferably made of a nylon or polypropylene webbing which exhibits good strength, wear resistance, and durability.

A majority of the length of waist belt 40 is overlaid by an outer webbing 48, which, as may be seen most clearly in FIG. 5, is sewn to waist belt 40 along upper and lower edges 50 and 52, to form a pocket 54 that extends about the length of a substantial portion of the waist encircling belt 40. The use of this waist belt pocket 54 will be discussed in greater detail shortly.

As may also be seen in FIGS. 1 and 2, and 3, the wading belt 24 is also provided with an elongated flexible basket securing strap 56. This basket securing strap 56 overlies the outer surface of the outer belt webbing 48. Strap 56 has two free ends and carries male basket securing clip components 58 at each of its free ends. These basket securing male clip components 58 are being slidable to vary their position along the basket securing strap 56. As will be discussed in detail shortly, these male clip components 58 are receivable in complimentarily shaped female basket securing clip components 60 that are attached to the flexible line receiving basket 22. The basket securing strap 56 can be attached to the outer surface of the outer belt webbing 48 in any desired manner, such as stitching or the like so long as it does not compromise the shape of the pocket 54 which is formed between the waist encircling belt 40 and the outer belt webbing 48. The belt webbing 48 and the basket securing strap 56 can be made of nylon or polypropylene webbing similar to that used for the waist encircling belt 40.

Turning now primarily to FIGS. 1 and 2, the first preferred embodiment of the flexible line receiving basket, generally at 22, of the line stripping basket 20 in accordance with the present invention will be discussed in detail. As may be seen in these two generally similar figures, flexible basket 22 is somewhat D-shaped in top plan view and is adapted to be releasably secured to the wading belt 24 so that it will be positioned generally at the waist of the angler 26 and will extend away from the angler 26 in a somewhat cantilevered manner. Flexible line receiving basket 22 is constructed having a fabric or a mesh sidewall 70, with an integral waist contacting panel 72. The fabric or mesh sidewall 70 has an upper sleeve 74 which, as may be seen in FIG. 4 may be formed by securing the upper portion of the sidewall fabric 70 back onto itself. Any suitable fastening, such as stitching, can be used to form the sleeve 74. It will be understood that sleeve 74 is discontinuous since it does not extend across the waist panel portion 72 of the side wall 70 of the flexible line receiving basket. This flexible sidewall 70 may, in the preferred embodiment be made of a nylon oxford cloth which is urethane coated. This flexible sidewall 70 has some body but is not stiff or inflexible. The two female basket securing clips 60 are secured to the outer surface of the upper sleeve 74 of the flexible fabric sidewall 70, as is shown most clearly in FIG. 3. Suitable short loops 76, which will be inserted through cooperatively sized apertures in the small female basket securing clips 60, and sewn back on themselves at 78, are used to secure the female basket securing clips 60 to the flexible sidewalls 70 generally at the ends of the upper sleeve 74. It will be understood that female clips 60 could be carried by the strap 56 and that the male clips 58 could be secured to upper sleeve 74, if desired.

An open mesh bottom 80 is placed in the flexible basket 22 by sewing of the mesh bottom 80 to a lower edge 82 of the flexible sidewall 70 of the flexible basket 22. The open mesh basket bottom 80 is, in accordance with the preferred embodiment, made of a woven nylon or polypropylene. The size of the mesh openings can be varied. In the preferred embodiment, the mesh openings are generally ovoid and are approximately ¼" in size. A mesh of this size provides easy water permeability but does not allow the line coils 34 to readily pass through its apertures. Although not specifically shown, it will be understood that the lower edge 82 of the sidewall 70 can be sewn or otherwise attached to the mesh bottom 80 in any suitable manner.

A flexible plastic band 90 is insertable into the upper sleeve 74 of the flexible sidewall 70 of the flexible line receiving basket 22. This flexible plastic band 90 is made from an ABS or similar plastic that remains flexible over a wide range of temperatures and that is quite resistant to degradation from ultraviolet light. As can be seen most clearly in FIG. 1, flexible plastic band 90 has free ends 92 and 94 that extend rearwardly from the sleeve 74 toward the wading belt 24. The flexible plastic band 90 is slidable in the upper sleeve 74 of the flexible sidewall 70 of the flexible basket 22 so that the basket can be centered on the band 90.

In use, the wading belt 24 is placed about the angler's waist and is secured in place by the engagement of the male and female waist buckle elements 42 and 44, respectively. As was indicated above, this waist buckle 46, which is preferably made of nylon, is generally conventional in structure and function. The belt 40 may be made snug about the waist of the angler 26 by movement of the free end of the belt 40 through the male buckle component 42. Once the wading belt 24 is in place, the flexible line receiving basket 22 can be fully opened from its collapsed or partially collapsed storage position. The free ends 92 and 94 of the basket band 90 will now be inserted into the pocket 54 of the wading belt 24. The two ends 92 and 94 of the flexible plastic band 90 may overlap each other, depending on the girth of the angler's waist. Such overlapping, if it occurs, does not affect the use or performance of the device. Once the band ends 92 and 94 have been slid into the wading belt pocket 54, the flexible line receiving basket 22 can be moved toward the wearer until the waist panel 72 of the flexible basket 22 contacts the wearer's waist. At this point, the small clips 58 on the basket securing strap 56 of the waist belt 24 can be inserted into their cooperating counterparts 60 on the flexible basket 22 to hold the basket 22 to the wading belt 24. The snugness and location of the flexible basket 22 on the wading belt 24 can be adjusted by sliding the male clips 58 along the basket securing strap 56. If the angler 26 should inadvertently lose his balance or otherwise stumble or fall, he can quickly shed the flexible basket 22 by releasing the small clip fastener 58 from their retainers 60 and by sliding the ends 92 and 94 of the flexible plastic band 90 out of the pocket 54 in the wading belt 24. This separates the basket 22 from the belt 24. The wading belt 24 also acts, in such an emergency, to restrict the flow the water into the angler's waders since the wading belt is typically comfortably but snugly secured about the waist of the angler 26.

After a day's use, the flexible basket 22 will be disengaged from the wading belt 24 which can then be removed. The flexible plastic band 90 can either remain in its sleeve 74 in the flexible basket, or can be removed from the sleeve 74. The components can be stored in a mesh belt pouch, generally at 100, as seen in FIG. 6. Belt pouch 100 may be formed of the same mesh as is used to form the mesh bottom 80 of the flexible basket 22. A suitable drawstring closure 102 is provided for a mouth 104 of mesh bag 100. Two spaced belt receiving loops 106 and 108 are attached to the mesh bag 100 so that the bag or pouch 100 can be carried on the angler's belt when the line stripping basket 20 is not in use.

Referring now to FIGS. 7 and 8, there may be seen a second preferred embodiment, generally at 110 of a line stripping basket in accordance with the present invention. In the description of this second preferred embodiment, the same reference numerals will be used for elements which are common to both first and second embodiments. This second preferred embodiment of the line stripping basket is generally similar to the first embodiment in overall structure and operation. A flexible basket, generally at 22, is attachable to a waist encircling wading belt 24 to position the line stripping basket in front of, and generally at the waist of a user. In this second embodiment of the line stripping basket, the side wall 70 of the flexible basket 22 has an upper sleeve 74 which receives the flexible plastic band 90. In addition, and as may be seen in FIGS. 7 and 8, the sidewall 70 is also provided with a lower sleeve 112. This lower sleeve 112 can be formed by turning a single layer of the sidewall material back on itself. Alternatively, the flexible sidewall 70 of the flexible basket 22 can be made of two plies of the appropriate fabric with the upper and lower sleeves 74 and 112 being defined by appropriately located stitchlines, which are not specifically shown in the drawings. As seen in FIG. 8, the open mesh bottom 80 can be secured to the flexible sidewall 70 of the flexible basket by a sewn attachment to a depending flap 114.

A plastic hoop 116 is placed in the lower sleeve 112. In manufacture, the flexible sidewall 70 can be sewn about the hoop 116, or the hoop 116 can be inserted into one end of the lower sleeve 112 which can then be sewn shut or otherwise closed. It should be noted that the lower hoop 116 is not a complete circle and thus is not a true hoop. The lower hoop 116 is discontinuous across the width of the waist panel 72 of the flexible basket 22. Thus the hoop 116, in its use position is more in the shape of a horseshoe. This lower hoop 116 provides additional form to the flexible basket 22 and aids in defining the basket's interior which will receive the line coils 34. The lower hoop 116 is preferably made of the same material used for the upper flexible band 90; i.e. a suitable ABS or similar plastic, but is approximately one half as wide as the upper band 90. This lower hoop 116 could, if desired, be removable from the lower sleeve 112 which could be provided with an end closure with a hook and loop or snap fastener, which is not specifically shown in the drawings.

Some anglers prefer that their line stripping basket have some mechanism which will hold the line coils 34 generally in place once they have been positioned in the interior of the basket. Other anglers do not want or need this capability. In order to provide the desired flexibility, the present invention provides stabilizing devices or structures which can be removably attached to the mesh bottom 80 of the line stripping basket 20. A first embodiment of a line stabilizer or spider is shown generally at 120 in FIGS. 7 and 9. One stabilizing device 120 or several such line stabilizers or spiders can be placed in the flexible basket 22 and will provide a holding or shift preventing function for the line coils 34 in the line stripping basket 20 or 110. As may be seen most clearly in FIG. 9, the stabilizing device 120 is preferably stamped or molded from polyethylene or similar material and may have a plurality of radially extending legs 122 that extent out from a central hub 124. Each leg 122 has a flat upper surface 126 with rounded or smoothed corners and each leg terminates in a shaped leg end 128. The leg ends 128 may be downturned, as seen in FIG. 10 and are sized to fit within an opening 130 of the open mesh bottom 80. Alternatively, the spider leg ends 128 can be somewhat spoon-shaped, as depicted in FIG. 11 and again will fit within an opening 130 of the mesh bottom 80. In either instance, the spider leg ends 128 are releasably received in the flexible mesh bottom 80.

Referring again to FIG. 9, each leg 122 of the line stabilizer or spider 120 is provided with a plurality of spaced holes or bores 132. These holes or bores 132 are sized to allow a user to insert either monofilament loops 134, or spikes 136, plastic tubing 138 into the legs of the spiders 120. This will allow each user of the line stripping basket 20 or 110 to effectively "customize" the flexible mesh bottom 80 in accordance with his own tastes. Thus a user can place one or more line stabilizers 120 in the line stripping basket 20 or 110 and can adapt each line stabilizer 120 with various loops, spikes, tubes or other shaped projections which he believes will best accomplish the task of holding the line coils 34 from shifting while still allowing them to be freely released from the flexible mesh bottom 80 of the line stripping basket 20 or 110 as a cast is being made.

The first preferred embodiment of the line stabilizing device, generally at 120, is depicted in FIGS. 7 and 9 in an unstressed or flat configuration. Referring now to FIG. 12 it will be seen that the line stabilizer 120 can be secured to the open mesh bottom 80 of the flexible basket 22 in an arched or bowed manner. This is easily accomplished by proper selection of the mesh openings 130 into which the leg ends 128 of the line stabilizer 120 are inserted. Since the line stabilizer or spider 120 is made of a flexible ABS or similar plastic, it can be bowed or arched upwardly in the manner depicted in FIG. 12. Such an arched or bowed placement of line stabilizer 120 will lock the stabilizer 120 in place and will also increase the effective height of the stabilizer 120 above the floor of the basket 22. It will be understood that the line stabilizer 120 depicted in FIG. 12 does not show the various loops 134, spikes 136 or tubes 138 that can be placed on it for ease of illustration.

Turning now to FIG. 13 there may be seen, generally at 140 a second preferred embodiment of a line stabilizer in accordance with the present invention. This second line stabilizer 140 has a generally rectangular stabilizer body 142, which, in the preferred embodiment is about 1.5 inches wide and about 5 inches long. This stabilizer body 142 is made of a suitable polyethylene or similar material as was the first line stabilizer 120 discussed previously. Each corner of the generally rectangular body 142 of the line stabilizer 140 is provided with a short leg 144 that is sized to be received in one of the mesh openings 130 of the open mesh bottom 80 of a line stripping basket 22. It will be understood that this second line stabilizer 140 can be positioned in mesh bottom 80 of a line stripping basket 22 in either a flat orientation or an arched orientation, as was discussed in connection with the first line stabilizer 120. The body 142 of line stabilizer 140 is provided with a plurality of holes or apertures 146. These can be arranged in several parallel lines, as depicted in FIG. 13 or could be arranged in any other desired pattern. These apertures 146 are the same in function as the holes or apertures 132 provided in the legs 122 of the first line stabilizer 120. While in FIG. 13 the second preferred embodiment 140 of the line stabilizer is depicted with a plurality of plastic or tubular loops 148, it will be understood that these are representative of a variety of loops, spikes, plastic or hollow tubes or the like which the individual angler could place in the apertures 146 of the line stabilizer 140 to "customize" it to his or her individual preference. One or a plurality of these line stabilizers 140 can be placed in the mesh bottom 80 of the line stripping basket 22.

There is depicted in FIG. 14, a second preferred embodiment, generally at 150 of a storage pouch in accordance with the present invention. This storage pouch 150 has an open mesh bottom 152 and has a fabric upper sidewall 154. A mouth 156 of this bag 150 is closed by a suitable drawstring 158. This storage pouch 150 is also provided with spaced belt receiving loops 160 and 162 so that the pouch 150 can be attached to the user's belt.

In use as has previously been alluded to, the line stripping basket 20 or 110 in accordance with the present invention, is removed from its belt secured pouch 100 or 150 and is separated into the waist engaging wading belt 24 and the flexible line receiving basket 22. The wading belt 24 is placed about the user's waist or hips and is secured by insertion of the male buckle tongue 42 into the female buckle receptacle 44. The free end of the belt 40 can be slid through the buckle tongue 42 to increase or decrease the circumference of the wading belt 24. Once the wading belt 24 is in place, the free ends 92 and 94 of the flexible plastic band 90 are inserted into the ends of the pocket 54 which extends around to the rear of the wading belt 24. The band ends 92 and 94 are directed to the rear of the belt 24 until the waist panel 72 of the flexible basket 22 is in contact with the user. The flexible line receiving basket 22 can now be attached to the wading belt 24 by use of the attachment clips 58 and receptacles 60. A suitable quantity of line 32 is now stripped off the reel 30 and is deposited in line coils 34 that are supported by the open mesh bottom 80 of the line stripping basket. If desired, one or more stabilizing devices, 120 or 140 may be placed on the basket's bottom 80. When the fly fisherman is done, he can remove the flexible basket 22 from the wading belt 24, can then remove the belt 24 and can store the line stripping basket in its storage pouch 100 or 150.

While preferred embodiments of a line stripping basket in accordance with the present invention have been set forth fully and completely hereinabove, it will be apparent to one of skill in the art that a number of changes in, for example, the type of fabric and mesh, plastic bands, buckles, the color of the basket and the like could be made without departing from the true spirit and scope of the present invention which is accordingly to be limited only by the following claims.

What is claimed is:

1. A line stripping basket usable to receive and support line stripped from a reel of a fishing rod, said line stripping basket comprising:

a wading belt securable about a person, said wading belt including a waist encircling belt and an outer belt webbing overlying a portion of said waist encircling belt, said waist encircling belt and said overlying belt webbing defining a pocket;

a flexible line receiving basket releasably connectable to said wading belt, said flexible line receiving basket having a flexible sidewall and a flexible open mesh bottom, said flexible side wall including a sleeve; and a flexible band supported in said sleeve in said flexible sidewall, said flexible band having band ends, said band ends being removably receivable in said pocket of said wading belt, said flexible line receiving basket being releasably connectable to said wading belt by insertion of said flexible band ends in said pocket.

2. The line stripping basket of claim 1 wherein said flexible sidewall of said flexible basket is fabric.

3. The line stripping basket of claim 1 further including a waist panel forming a part of said flexible sidewall, said waist panel being positionable adjacent a user of said line stripping basket.

4. The line stripping basket of claim 1 further including a basket securing strap overlying said outer belt webbing and having strap ends extending from said waist encircling belt beyond said pocket.

5. The line stripping basket of claim 1 wherein said waist encircling belt has belt ends and further including coengaging waist belt buckle components on said belt ends.

6. The line stripping basket of claim 4 further including first components of basket securing clips on said strap ends.

7. The line stripping basket of claim 6 further including second components of basket securing clips on said flexible sidewalls, said first and second components of said basket securing clips being engageable to secure said flexible basket to said wading belt.

8. The line stripping basket of claim 1 wherein said flexible band is slidably positioned in a sleeve formed in said flexible sidewall of said flexible basket.

9. The line stripping basket of claim 1 further including a line stabilizing device securable to said mesh bottom of said flexible line receiving basket.

10. The line stripping basket of claim 9 wherein said line stabilizing device has a plurality of legs with each said leg having at least one bore.

11. The line stripping basket of claim 10 further including line coil stabilizing projections positioned in said bores and extending above said legs.

12. The line stripping basket of claim 9 wherein said line stabilizing device has a generally rectangular body with a leg at each corner of said body.

13. The line stripping basket of claim 12 wherein said body has a plurality of apertures.

14. The line stripping basket of claim 13 further including line coil stabilizing projections positioned in said apertures and extending above said body.

15. A line stripping basket usable to receive and support line stripped from a reel of a fishing rod, said line stripping basket comprising:

a waist encircling wading belt securable about a person;

a flexible line receiving basket releasably connectable to said wading belt, said flexible line receiving basket having a flexible sidewall and a flexible open mesh bottom; and a line stabilizing device securable to said mesh bottom of said flexible line securing basket, said line stabilizing device having a plurality of legs, each of said legs having at least one bore.

16. The line stripping basket of claim 15 further including line coil stabilizing projections positioned in said bores and extending above said legs.

17. A line stripping basket usable to receive and support line stripped from a reel of a fishing rod, said line stripping basket comprising:

a waist encircling wading belt securable about a person;

a flexible line receiving basket releasably connectable to said wading belt, said flexible line receiving basket having a flexible sidewall and a flexible open mesh bottom; and a line stabilizing device securable to said mesh bottom of said flexible line receiving basket, said line stabilizing device having a generally rectangular body with a leg at each corner of said body.

18. The line stripping basket of claim 17 wherein said body has a plurality of apertures.

19. The line stripping basket of claim 18 further including line coil stabilizing projections positioned in said apertures and extending above said body.

* * * * *